United States Patent [19]

Lussi et al.

[11] Patent Number: 5,571,588
[45] Date of Patent: Nov. 5, 1996

[54] DURABLE INLAID FLOOR COVERINGS HAVING A UNIFORM, UNPATTERNED DECORATIVE APPEARANCE

[75] Inventors: Edward F. Lussi, Bethlehem; Thomas G. Smith, Easton, both of Pa.

[73] Assignee: Tarkett Inc., Parsippany, N.J.

[21] Appl. No.: 283,717

[22] Filed: Aug. 1, 1994

Related U.S. Application Data

[63] Continuation of Ser. No. 102,396, Aug. 5, 1993, abandoned, which is a continuation of Ser. No. 362,344, Jun. 6, 1989, abandoned.

[51] Int. Cl.$^6$ .............. B32B 3/10; D06H 7/04; B05D 3/02; B05D 1/36
[52] U.S. Cl. .............. 428/46; 428/144; 428/147; 428/206; 428/323; 428/325; 428/327; 428/908.8; 428/913; 427/195; 427/203; 427/278; 427/366
[58] Field of Search .............. 428/144, 147, 428/46, 206, 323, 325, 327, 908.8, 913; 427/195, 203, 278, 366

[56] References Cited

U.S. PATENT DOCUMENTS

| | | |
|---|---|---|
| 4,126,727 | 11/1978 | Kaminski .............. 428/172 |
| 4,212,691 | 7/1980 | Potosky et al. .............. 156/79 |
| 4,267,221 | 5/1981 | Ishikawa .............. 428/121 |
| 4,418,109 | 11/1983 | Miller, Jr. et al. .............. 428/142 |
| 4,456,643 | 6/1984 | Colyer .............. 428/156 |
| 4,558,087 | 12/1985 | Yamakawa et al. .............. 524/495 |
| 4,794,020 | 12/1988 | Lussi et al. .............. 427/195 |
| 4,826,912 | 5/1989 | Ko et al. .............. 524/567 |
| 4,882,205 | 11/1989 | Valenduc .............. 427/204 |
| 4,916,007 | 4/1990 | Manning et al. .............. 428/203 |

Primary Examiner—Terrel Morris
Attorney, Agent, or Firm—Brooks Haidt Haffner & Delahunty

[57] ABSTRACT

The present invention relates to commercial and institutional inlaid floorcoverings having a uniform, unpatterned decorative appearance. Colored spheroidal particles having an aspect ratio no greater than about 2:1 are provided in a dense, uniform matrix layer to create the decorative appearance. Flame retardant and smoke suppressant compositions can be incorporated in the floorcoverings without detrimentally affecting their appearance.

26 Claims, No Drawings

DURABLE INLAID FLOOR COVERINGS HAVING A UNIFORM, UNPATTERNED DECORATIVE APPEARANCE

This application is a continuation of application Ser. No. 08/102,396, filed Aug. 5, 1993 which in turn is a continuation of application Ser. No. 07/362,344, filed Jun. 6, 1989 both now abandoned.

BACKGROUND OF THE INVENTION

1. Field of the Invention

The present invention relates to durable inlaid floorcoverings which are particularly suited to commercial, institutional and other heavy duty wear applications and a process for manufacturing such floorcoverings. More particularly, the invention relates to the use of spherical or essentially spherical (hereinafter "spheroidal") particles having an aspect ratio no greater than about 2:1. The spheroidal particles are provided in a dense, uniform matrix layer to create a uniformity of appearance which is superior to previously known, unpatterned, inlaid floorcovering products having similar applications.

2. Description of Related Art

Sheet materials, in particular sheet vinyl flooring products, made with particulate materials, are commonly referred to as inlaids. These products and processes for their manufacture are well known in the floorcovering art and originate back to the early linoleum times where through-patterned floorcoverings, based on linseed oil, cork dust and resins were developed by the industry. The process was later modified for vinyl.

Vinyl inlaid floorcoverings are generally made either by embedding particulate materials into a plastisol or by compacting (or sintering) particulate materials into a patterned mass. Various printing techniques are used to create desired design effects for most applications.

U.S. Pat. No. 4,212,691 to Potosky et al. discloses a method for making inlaid sheet materials using decorative chips or flakes. The chips or flakes are deposited on a layer of wet, tacky, ungelled plastisol which is optionally printed. As the chips or flakes are deposited, the ungelled plastisol is continuously moving forwardly and upwardly at an angle greater than the angle of repose for the decorative chips or flakes. At the same time, the surface of the ungelled plastisol is vibrated so that excess chips or flakes which have not adhered to the surface slide backwardly toward the place where they were deposited. The chip or flake coated surface is then processed under pressure at elevated temperatures whereby the wet, tacky, ungelled plastisol and the decorative chips or flakes are compressed into a single layer and the ungelled plastisol is transformed into a gelled plastisol.

It is difficult to obtain floorcoverings having a uniform unpatterned appearance by using the Potosky et al. materials and method. This is because of the irregularity of the chips or flakes and the unpredictable difficulties of depositing them uniformly on a wet, tacky, ungelled plastisol.

In Kaminsky, U.S. Pat. No. 4,126,727, resinous polymer sheet materials having selective decorative effects are disclosed. The sheet materials comprise a resinous polymer layer which is printed with a pattern or design having relatively dark and relatively light colored portions. The printed layer is coated with a second resinous polymer layer having decorative chips or flakes embedded therein. The decorative chips or flakes are relatively small or flat and comprise a very thin layer of transluscent or transparent platelets having a refractive index relative to surrounding material which causes certain light wave interference and color absorbtive effects. The product has a non-uniform nacreous appearance.

A well known product having commercial applications is made by the Forbo company in Gothenburg, Sweden. The product, called Smaragd, is a vinyl sheet floorcovering. Smaragd is comprised of a solid polyvinyl chloride (hereinafter "PVC") substrate reinforced with a non-woven glass fiber web. A foamable plastisol is applied in a random pattern followed by a clear vinyl coating containing evenly dispersed colored particles. The colored particles are generally low aspect ratio beads. Finally, an overcoating wearlayer of PVC is applied.

When beads (or any other kind of particles) are admixed with a liquid plastisol composition prior to application to a surface, as in the production of Smaragd, it is not possible to obtain a dense coating of particles. This is due to viscosity and other interfering factors inherent in the plastisol. As a practical matter, therefore, the maximum density of the beads is limited to about fifteen to twenty percent by weight. Total bead coverage in the final product is, therefore, effectively unattainable.

Instead of the chips, flakes, or granules heretofore generally used in the production of inlaids, it has recently been found advantageous to use spheroidal resinous particles, sometimes referred to in the art as "pearls" or "beads", for certain applications. A method for preparing such spheroidal resinous particles from plasticised PVC is disclosed in U.S. Pat. No. 3,856,900 to Erb.

Residential floorcoverings having a layer of spheroidal resinous particles in a resinous polymer layer overcoating a printed pattern or design are described in U.S. patent application Ser. No. 773,984, filed Sep. 9, 1985. The spheroidal resinous particles may be transparent, transluscent or opaque; colored or non-colored. However, at least some of them must permit the underprint to show through so that the printed pattern or design will be visible.

There is presently a demand for commercial and institutional floorcoverings having a clean, seamless, uniform, unpatterned appearance. Uniformly appearing, unpatterned floorcoverings have traditionally been the most difficult to produce, compared with those having a pattern or design. This is because slight irregularities in processing or materials used cause defects in appearance which are readily apparent, even to the untrained eye. In addition, commercial and institutional floorcoverings must meet stringent fire retardant and smoke suppressant requirements. The fire retardant and smoke suppressant compositions which must be added to such floorcoverings, however, have detrimental affects on their appearance, making them cloudy and/or dull.

It has now been found in accordance with the present invention that durable inlaid floorcoverings having a superior, uniform, unpatterned appearance, excellent wear and seaming characteristics, and superior flexibility, colorations and color durability can be produced using a dense matrix layer of spheroidal particles. Moreover, fire retardant and smoke suppressant compositions can be added without detrimentally affecting the appearance of such floorcoverings.

SUMMARY OF THE INVENTION

In accordance with this invention, durable inlaid floorcoverings which are suitable for commercial and institutional applications are made by coating a substrate with, optionally, a smooth layer of tinted latex. The tinted latex layer (or the substrate, if no latex layer is used) is coated with an essentially smooth, ungelled, vinyl plastisol adhesive layer. A substantially uniform layer of spheroidal particles having an aspect ratio no greater than about 2:1 is then deposited over the vinyl plastisol adhesive layer to prepare an intermediate product useful for making said durable inlaid floorcoverings. The spheroidal particles, which are colored and may be transluscent or opaque, are deposited in sufficient density to essentially prevent the underlying layer or layers from showing through.

The intermediate product is subjected to heat and, preferably, pressure to embed the spheroidal particles in the vinyl plastisol adhesive layer and gel the ungelled vinyl plastisol. One or more wearlayers of vinyl plastisol can then be added. Optionally, or in addition to the vinyl plastisol wearlayer, one or more wearlayers of polyurethane can be added.

The durable inlaid floorcoverings of the invention have a uniformity of appearance which is far superior to anything previously achieved in unpatterned, inlaid vinyl floorcoverings. They are easily installed and seamed, have excellent wear characteristics, superior flexibility, colorations and color durability, and can be made flame retardant and smoke suppressant without detrimentally affecting appearance. The floorcoverings can also be produced with static-dissipative properties for computer rooms, electronic products production and assembly areas, clean rooms, pharmaceutical plants and the like.

DESCRIPTION OF THE PREFERRED EMBODIMENTS

The Substrate

The substrate is a relatively flat, fibrous or non-fibrous, backing sheet material, such as a fibrous, felted or matted, relatively flat sheet of overlapping, intersecting fibers. The substrate can, if desired, comprise asbestos or non-asbestos (preferably non-asbestos) felts or papers which are woven or nonwoven. It can comprise knitted or otherwise fabricated textile material or fabrics made from cellulose, glass, natural or synthetic organic fibers, or natural or synthetic inorganic fibers, or supported or non-supported webs or sheets made therefrom, or filled or unfilled thermoplastic or thermoset polymeric materials. These and other substrate base materials are well known in the art and need not be further detailed here.

Latex Layer

The latex layer is optional. It is a smooth coating which may be colored or not colored, filled or unfilled. In a preferred embodiment, the latex is tinted with a color which is compatible with the colors of the spheroidal particles which are used in accordance with the invention. Most preferably, the latex layer is tinted with a color which is the average of the colors of the spheroidal particles. To one skilled in the art, the average color means the color perceived when one looks at a surface from a distance of more than about five feet. Also, the latex layer is preferably used as a carrier for flame retardant and smoke suppressant compositions.

The latex layer is substantially uniformly coated over the substrate to a thickness from about 1 to about 4 mils, preferably from about 1.5 to about 2.5 mils. Conventional means for coating the substrate with the latex layer can be used and are not critical to the invention. Such means include an air knife, a rotogravure roller with a plain edge, rotary screen, draw down bar, or wire wound bar (wherein the grooves provided by the wires assist in metering the flow of the latex).

Following application of the latex layer, it is dried prior to further processing. This can be accomplished in a hot air oven at a temperature from about 225 to about 350 degrees F., preferably from about 275 to about 300 degrees F., for from about 4 minutes to about 30 seconds, preferably from about 2 minutes to about 30 seconds. Lower temperatures and longer times may be used as long as conditions are adequate to remove water. Higher temperatures and shorter times may also be used with sufficient air velocity as long as the latex layer is not caused to bubble.

The latex layer can be made from any commonly available latex formulation as long as it is compatible with the substrate and the adhesive layer. The latex composition preferably should have minimal smoke generating properties and should be moisture resistant and have good aging properties. It should also have good adhesion compatibility with the adhesive layer. Suitable latexes include crosslinkable ethylene vinyl acetate latexes, crosslinkable acrylic latexes, ethylene vinyl chloride emulsions, PVC and polyvinyl acetate latexes, PVC and polyvinyl acetate copolymer latexes, and butadiene-acrylnitrile latexes.

When the latex layer is tinted, a color pigment may be used which is chemically compatible with the latex composition and the other components of the product. Suitable color pigments include inorganic or mineral pigments such as titanium dioxide, chromium dioxide, cadmium sulfide, iron oxide, carbon black and the like.

Adhesive Layer

The adhesive layer is normally a plastisol or organosol additionally containing a plasticiser system, associated diluents, viscosity control aids and stabilizers.

As used herein the term "plastisol" is generally intended to cover a relatively high molecular weight PVC resin dispersed in one or more plasticisers. The plastisol upon heating or curing forms a tough plasticised solid. For purposes of this specification, plastisol compositions are also intended to include organosols, which are similarly dispersed PVC resin materials that, in addition, contain one or more volatile liquids which are driven off upon heating.

Although the preferred adhesive layer is a PVC homopolymer resin, other vinyl chloride resins can be employed. Exemplary are vinyl chloride-vinyl acetate copolymers, vinyl chloride-vinylidene chloride copolymers and copolymers of vinyl chloride with other vinyl esters, such as vinyl butyrate, vinyl propionate, and alkyl substituted vinyl esters, wherein the alkyl moiety preferably is lower alkyl containing between about 1–4 carbons. Other suitable synthetic resins such as polystyrene, substituted polystyrene (preferably wherein the substituents are selected from the group consisting of alkyl having 1–10 carbons, preferably 1–4 carbons, and aryl having 6–14 carbons), polyolefins such as polyethylene and polypropylene, acrylates and methacrylates, polyamides, polyesters and any other natural or synthetic resin capable of being applied to the substrate or latex layer of this invention to provide a smooth and uniform adhesive surface; provided that such resin is otherwise compatible with the overall product composition and, therefore, within the principles of this invention. Thus it is not essential that a plastisol always be used. Organosols and aqueous latexes are also of use, employing as the dispersing or suspending media, organic solvents and water, respectively, rather than plasticizers, as in the case of a plastisol.

When the preferred plastisol is employed, typical plasticisers which can be used are dibutyl sebacate, butyl benzyl sebacate, dibenzyl sebacate, dioctyl adipate, didecyl adipate, dibutyl phtalate, dioctyl phtalate, dibutoxy ethyl phtalate, butyl benzyl phtalate, dibenzyl phtalate, di(2-ethylhexyl) phtalate, alkyl or aryl modified phtalate esters, tricresyl phosphate, octyl diphenyl phosphate, dipropylene glycol dibenzoate, dibasic acid glycol esters, and alkyl, aryl, or alkylaryl hydrocarbons, and the like.

Those skilled in the art will appreciate that in addition to the basic resin constituents, other commonly employed constituents can be present in plastisols in minor proportions. These can include a blowing or foaming agent such as azodicarbonamide (if a blowing or foaming procedure is desired), conventional stabilizers/accelerators, initiators, catalysts, etc., such as zinc oleate, dibasic lead phosphite, etc., conventional heat or light stabilizers, such as metallic soaps, etc., ultraviolet absorbers, colorants, dyes or pigments, notably titanium dioxide, solvents and diluents, such as methyl ethyl ketone, methyl isobutyl ketone, dodecyl benzene, etc., fillers such as clay, limestone, etc., viscosity modifiers, antioxidants, bacteriostats and bacteriocides, flame retardants, smoke suppressants, antistatic agents, and the like.

Preferably, the adhesive layer employed in the process and products of this invention is a clear, unfilled, resinous polymer composition, such as a PVC plastisol. The adhesive layer is substantially uniformly applied to the underlying surface by conventional means such as a knife-over roll coater, direct roll coater, rotary screen, draw down bar, reverse roll coater or wire wound bar. The particular means for applying the adhesive layer does not relate to the essence of the invention and any suitable coating means can be employed.

The thickness of the adhesive layer, as it is applied in its wet, tacky, ungelled state to the underlying surface, is substantially uniform, and is in the range from about 4 to about 30 mils, preferably from about 10 to about 20 mils. The layer can be thinner or thicker as may be required by the particular product application, as long as it is thick enough to accomodate the dense layer of spheroidal particles which subsequently will be embedded into it.

Although various homopolymers and copolymers of vinyl chloride may be used as described above, current economics dictate the use of PVC plastisols of the type set forth later in this specification in the Examples.

Spheroidal Particles

The spheroidal particles used in this invention can be of various sizes. They can be comprised of various homogeneous or heterogeneous polymeric or inorganic materials or mixtures thereof. Suitable particles can be made from any one, or a combination or mixture, of ceramics, metals, rubbers, acrylics, plastisols, polyamides, polyolefins, polycarbonates, and polyesters. As noted above, they are spherical or essentially spherical and have an aspect ratio not greater than about 2:1. The spheroidal particles are preferably made from a PVC type plastisol (such particles being referred to herein as spheroidal resinous particles). Each spheroidal resinous particle is transluscent or opaque and contains its own individual colorant, pigment or dye. In a preferred embodiment of the invention, multicolored spheroidal resinous particles are used to give a uniform, unpatterned, textured inlaid appearance to the floorcoverings.

A preferred method of making the spheroidal resinous particles is to heat dry PVC by agitating it in a container provided with a propeller agitator, such as a Henschel Mixer, at a speed up to about 3000 r.p.m., until it reaches a temperature of about 160 degrees F. The speed is then lowered to about 500 r.p.m. during addition of a PVC plasticiser, stabilizer and a color dispersion. The agitator speed is then increased to about 3000 r.p.m. until the temperature of the mixture reaches about 230 degrees F. Then the agitator speed is lowered to allow cooling to about 100 degrees F. and the spheroidal resinous particles thereby produced are discharged.

The spheroidal particles and their dense uniform deposition on the adhesive layer are critical to the superior, uniform, unpatterned decorative effects achieved in accordance with the present invention. The colors of the spheroidal particles determine the colors of the floorcoverings of the invention. When a tinted latex layer is used and is tinted with a color which is the average of the colors of the spheroidal particles, the color of the floorcovering will not appear to change as it wears down.

The spheroidal particles have a maximum length along their longitudinal axes (i.e. their longest dimension) of about 50 mils. The range in sizes of the spheroidal particles along their longitudinal axes is generally from about 8 to about 30 mils, with a range from about 15 to about 25 mils being preferred.

The spheroidal particles must be uniformly and densely deposited on the adhesive layer so that the underlying material is essentially completely covered. In other words, any underlying material which may show through the densely deposited spheroidal particles will be aesthetically insignificant. While one hundred percent coverage is not critical, it is an objective of the invention to cover every portion of the underlying layer or layers with at least one spheroidal particle. As this objective is approached, the uniformity of appearance of the inlaid floorcovering product is substantially enhanced. An excess of spheroidal particles is preferably used to insure maximum coverage and greatest uniformity in appearance of said inlaid floorcovering product. In an especially preferred embodiment of the invention, an essentially double layer of spheroidal particles is used.

In order to achieve the desired effects in accordance with the preferred embodiment of the invention, spheroidal resinous particles are deposited at a density up to about 0.8 pounds per square yard. A density from about 0.55 to about 0.65 pounds per square yard is most preferred.

After the spheroidal particles are embedded in the adhesive layer and the adhesive layer is gelled as described below, another layer of adhesive can be added and covered with spheroidal particles. This process can be repeated as often as desired, keeping in mind that the spheroidal particles must be embedded in the adhesive layer and the adhesive layer must be gelled before other layers are added.

Various means can be used to deposit the spheroidal particles on the adhesive layer. Known apparatus such as a magnetic vibrating pan or trough or a VILLARS powder coater by Villars Maschinenbau, Muenchwilen, Switzerland can be used. A particularly preferred means is to use a dry material dispensing machine of the type disclosed and claimed in U.S. Pat. Nos. 3,070,264 and 3,073,607 to Christy. Machines of this type are available from the Christy Machine Company, P.O. Box 32, Fremont, Ohio. The Christy "COAT-O-MATIC" (also called the "SIEVE-O-DUSTER") is particularly preferred.

The COAT-O-MATIC is normally used by the food industry to apply things like poppy seeds on rolls, sugar on cookies, and the like. However, it can easily be modified by one skilled in the art to uniformly deposit spheroidal particles in the production of floorcoverings. The modifications are required to improve the uniformity of application of the spheroidal particles. In particular, the ability to make adjustments must be refined and vibrations and deflections must be reduced.

We found that the following modifications to the COAT-O-MATIC made it suitable for depositing spheroidal particles in accordance with this invention:

1. A larger diameter, knurled dispensing roll is used to reduce deflection and eliminate wobble which otherwise causes recurring bands of light and heavy application of the spheroidal particles. The dispensing roll should have a total indicated run-out of less than or equal to about 0.010 inch, deflection due to weight of less than or equal to about 0.030 inch and a balance of less than or equal to about 2 inch ounces. The rigidity of the dispensing roll should be sufficient to prevent "galloping" (where the roll remains deflected in one orientation; thereby causing it to rotate like a banana).
2. An adjustable rubber applicator blade mounted on a reinforced holder is used to provide refined adjustment of the pressure for uniform application across the width of the machine.
3. Adjustment means are added to the brush holder to provide adjustment of pressure on the brush accross the width of the machine.
4. Reinforcement of the hopper is required to limit deflections along its length. Deflections less than or equal to about 0.030 inch being preferred.

The foregoing modifications can be made by various means by those skilled in the art consistent with the objectives set forth above and elsewhere in this specification.

The density of spheroidal particles deposited using the modified COAT-O-MATIC can be adjusted for a given line speed by varying the speed of rotation of the dispensing roll.

At this point in the process of the invention, an intermediate product has been prepared which is useful for manufacturing floorcoverings having an exceptionally uniform, unpatterned appearance.

Embedding the Sphereoidal Particles in The Adhesive Layer and Gelling the Adhesive Layer When the spheroidal particles are embedded in the adhesive layer, the adhesive layer is simultaneously gelled, thereby forming a matrix layer of spheroidal particles in a gelled adhesive. This can be achieved by heating the intermediate product in an oven at a temperature from about 260 to about 350 degrees F., preferably from about 275 to about 300 degrees F., for from about 4 minutes to about 1 minute, preferably from about 2.5 to about 1.5 minutes. In a preferred embodiment of the invention, however, embedding and gelling are achieved by using a hot chrome drum provided with a pressure belt as described in U.S. Pat. No. 4,794,020 to Lussi, et al. The drum is heated to a temperature from about 260 to about 350 degrees F., preferably from about 275 to about 320 degrees F. The intermediate product is maintained in contact with the drum for from about 3 minutes to about 10 seconds, preferably from about 60 to about 15 seconds. In another embodiment, supplementary heat can be used, e.g. infrared or the like, prior to heating in an oven or on a drum, thereby shortening the heating times set forth above.

Gelling conditions will also vary with the molecular weight of the resin and other properties such as the solvating properties of the resin and plasticiser. Those skilled in the art will recognize the importance of applying sufficient heat to gel the adhesive layer, while avoiding excessive heat which could damage the product.

The spheroidal particles in the matrix layer essentially completely cover the underlying material (i.e. the underlying latex layer, or the substrate if no latex layer is used) in the same manner as the spheroidal particles essentially completely cover the underlying material before they are embedded into the adhesive layer. In other words, any underlying material which may show through the spheroidal particles in the matrix layer will be aesthetically insignificant.

Plastisol Wearlayer

An essentially smooth coating of plastisol can optionally be applied over the matrix layer. This can be accomplished by using the same means used to apply the adhesive layer. The smooth coating of plastisol can then be gelled in an oven or with a hot chrome drum under the same conditions as described above with reference to gelling the adhesive layer. A plastisol wearlayer is thereby secured to the underlying surface. This process can be repeated to provide additional wearlayers as desired. The plastisol wearlayers can have a thickness of from about 4 to about 100 mils, and preferably have a thickness of from about 10 to about 40 mils.

In a particularly preferred embodiment, two clear plastisol wearlayers are used. After the first wearlayer is applied and gelled using a hot chrome drum, it is embossed at a temperature which will allow the embossing to be reversed upon the subsequent application of heat. Then a second plastisol layer is applied followed by fusing in an oven. This causes the stresses created by embossing in the first wearlayer to relax, thereby causing a reverse embossing effect in the second wearlayer. A reverse embossed wearlayer is amenable to easy cleaning.

Urethane Wearlayer

Polyurethanes can also be used for wearlayers in accordance with the invention. They can be used instead of plastisol wearlayers or in addition to them. A smooth coating of polyurethane can be applied using the same means as those used to apply smooth coatings of latex. Polyurethane can also be applied by laminating it onto another substrate and applying it to a surface with an adhesive.

Depending upon the chemistry of the polyurethane, the polyurethane layer can be cured by heat, chemical reaction, ultraviolet light or electron beam radiation. A preferred means is high energy ultraviolet light.

The cured polyurethane layer can be from about 0.1 to about 10 mils thick and is preferably from about 0.25 to about 4 mils thick. Additional layers of polyurethane can be used if desired. In a particularly preferred embodiment of the invention, one polyurethane wearlayer is applied over the reverse embossed plastisol wearlayer described above.

The composition of the polyurethane wearlayer can include any number of commercially available formulations as long as they are compatible with the other components of the floorcovering of the invention and the objectives of the invention as set forth in this specification. Common urethane oligomers include polyester, polyether, epoxy, epoxy-acrylic and polyamides. The most preferred types are urethane-acrylo based oligomers diluted with acrylic monomers and containing photoinitiators to provide the means for radiation curing. This is considered to be a thermoset polymer system in that the oligomers are unsaturated resins with functional groups that interact with each other and with the monomers providing chemical linkages during the polymerization process. The reactions are terminated by photopolymerizable groups made available on the interacting components. The chemical linkages that are created between groups and polymer chains characterize the radiation cured urethanes as thermoset materials as opposed to thermoplastic polymers in which functional groups either do not exist or do not interact. The thermoset properties are unique in that urethane films will not remelt when heated and in general exhibit a harder, more inert character than thermoplastic polymers. Normally, they will provide better scuff resistance and retained gloss when compared with the common thermoplastic PVC alternative.

Flame Retardants and Smoke Suppressants

Conventional flame retardants and smoke suppressants which are compatible with the various materials used in accordance with the invention can be added at any stage of the process. They can be impregnated into the substrate, admixed with the latex layer and/or the adhesive layer, and/or admixed with any of the plastisol and/or urethane wearlayers. Sphereidal resinous particles and other types of spheroidal particles containing such compositions can also be manufactured for use in accordance with the invention. In the preferred embodiment of the invention, effective quantities of flame retardants and smoke suppressants are admixed with the latex layer and/or one or more of the plastisol layers.

Flame retardants and smoke inhibitors which can be used in accordance with the invention include aluminum trihydrate, zinc borate, magnesium hydroxide, antimony trioxide, phosphates and other compounds and compositions which are compatible with the various constituents of the products of the present invention. They are added in effective amounts which will be apparent to those skilled in the art based on manufacturers specifications and code requirements.

Static Dissipation

In order to adjust the electrical properties of the product of the invention, the formulation of the coating used in each layer and the composition of the substrate may need to be modified. The objective is to lower the resistance (raise the conductivity) of the product. Standards and testing procedures for surface to surface and surface to ground resistance for floorcoverings are well known in the industry. A preferred range for the products of the invention is 1,000,000 to 1,000,000,000 ohms as tested per ASTM F-150-72 (standard test method for electrical resistance of conductive floorcovering). This test is conducted at 500 volts direct current and 50% relative humidity.

In the preferred embodiment of the invention, carbon fibers are incorporated into the substrate to lower its resistance. Antistatic agents that can be added to the latex layer, adhesive layer and wearlayers are commercially available and known in the art. Suitable antistatic agents include Nopcostate HS, an ethoxylated composition from Diamond Shamrock and Tebestat IK 12, a nonionic substituted polyether from Dr. Th. Boehme KG, Chem. Fabrik GMBH & Co., 8192 Geretsried 1, Germany. The particular compositions used are not critical as long as they are compatible with the other components present in the durable inlaid floorcoverings of the invention. The antistatic agents may be added in various amounts as will be apparent to those skilled in the art depending on recommendations of the manufacturers of said compositions and the desired specifications for the floorcovering product. A polyurethane wearlayer is not used in the preferred static-dissipative embodiment of the invention.

Having set forth the general nature and some preferred embodiments of the present invention, a further description is provided in the following examples.

EXAMPLE 1

A conventional floorcovering substrate sheet made from non-asbestos felt (Tarkett Inc., Whitehall, Pa.) approximately 33 mils thick is coated with a layer of a tinted latex composition having fire retardant and smoke suppressant properties. The tinted latex layer is about 2 mils thick (dry) and has the following composition:

| Component | Parts by Weight |
|---|---|
| Sodium hexametaphosphate | 1 |
| Water | 220 |
| Aluminum trihydrate | 150 |
| Ethylene-vinylacetate latex (50%) | 130 |

Aqueous dispersion of color pigment as needed.

The latex layer is applied using a No. 60 wirewound bar. The coated substrate is then dried in a hot air oven at 275 degrees F. for 2 minutes.

The dried latex-coated substrate is then coated to a thickness of about 15 mils with a vinyl plastisol adhesive layer using a draw down bar. The vinyl plastisol adhesive has the following composition:

| Component | Parts by Weight |
|---|---|
| PVC dispersion resin having a K value of 65 (Occidental FPC 605) | 70 |
| PVC extender resin having a K value of 60 (Goodyear Pliovic M 50) | 30 |
| Glycol-butyrate-benzoate (Nuoplaz 1538, Tenneco Chemicals, Inc.) | 26 |
| Texanol isobutyrate (Eastman TXIB) | 7 |
| Linear alkyl benzene | 4 |
| Barium-zinc stabilizer | 4 |
| Epoxidized soya oil | 5 |
| Zinc borate | 5 |

The wet, tacky, adhesive layer is then coated with spheroidal resinous particles having an average particle size of about 16 mils. The spheroidal resinous particles are colored and their average color is about the same as the color of the tinted latex layer. The particles have the following composition:

| Component | Parts by Weight |
|---|---|
| Suspension grade PVC resin having a K value of 65 (Pevikon S 658 GK, coarse grade) | 100 |
| Butyl benzyl phtalate | 33 |
| Barium-zinc stabilizer | 4 |
| Titanium dioxide | approx. 5 |
| Color pigments as needed | approx. 5 |

(The titanium dioxide and color pigments are dispersed in dioctyl phtalate.)

A COAT-O-MATIC powder coater is used to deposit the spheroidal resinous particles on the adhesive layer. By this means, the density of spheroidal resinous particles is regulated by varying the speed of the knurled dispensing roll as described earlier in this specification. A uniform coating of spheroidal resinous particles having a density of about 0.6 pounds per square yard is deposited.

The coated sheet is then gelled in a hot air oven for 2 minutes at 275 degrees F. Alternatively, and preferably, it is gelled against a hot chrome drum provided with a pressure belt. The drum surface is at about 300 degrees F. and contact time is for about 30 seconds.

The next step is the smooth coating of the gelled surface by applying a layer of plastisol with a No. 38 wirewound bar. The plastisol used in this step has the same composition as in the adhesive layer. This coating is gelled against a hot chrome drum provided with a floating rubber pressure roll at a temperature of about 335 degrees F. for about 30 seconds. The hot gelled coating is then embossed between a chilled steel embosser roll and a rubber roll to a depth of about 12 mils. (Embossing done at this relatively low temperature is not permanent and will reverse during further heat treatment at a temperature which is higher than the embossing temperature.) At this point the sample has a thickness of the matrix (not including the felt substrate) of about 37–39 mils.

Now a topcoat layer having a thickness from about 11–13 mils is applied with a 24 mil drawdown bar. The topcoat layer has the following composition:

| Component | Parts by Weight |
| --- | --- |
| PVC dispersion resin having a relative viscosity of 2.3 | 30 |
| PVC dispersion resin having a relative viscosity of 3.3 | 30 |
| PVC extender resin having a K value of 60 (Goodyear Pliovic M 50) | 40 |
| Glycol-butyrate-benzoate | 15 |
| Texanol isobutyrate | 10 |
| Di-iso nonyl phtalate | 8 |
| Barium-zinc stabilizer | 4 |
| Epoxidized soya oil | 5 |
| Zinc borate | 3 |

The topcoat layer is fused to the underlying material in a two-zone hot-air tunnel oven provided with a conveyor which is moved continuously at constant speed. The first zone is maintained at 390 degrees F. and the second zone is maintained at 360 degrees F. Residence time of the sheet in both zones is 3.25 minutes, with about half of the residence time being in each zone. This operation fuses together all of the plastisol layers and reverses the embossing.

A nip coater is used to add about 2 mils of ultraviolet curable polyurethane. The polyurethane is cured under ultraviolet light in a nitrogen atmosphere.

EXAMPLE 2

A commercial product was made using the same substrate material used in Example 1. The substrate material was twelve feet wide.

An air knife was used to coat the substrate with a tinted latex layer having the same composition as the latex in Example 1. This was dried in a hot air oven at 280 degrees F. for 2 minutes. The dry latex layer had a thickness of about 2 mils.

A reverse roll coater was used to apply an adhesive layer over the dry latex layer. The adhesive layer had a thickness of about 15 mils and was an ungelled adhesive plastisol having the same composition as in Example 1.

The adhesive layer was then passed under a SIEVE-O-DUSTER powder coater. Premixed spheroidal resinous particles were uniformly deposited on the surface of the adhesive layer at a density from about 0.55 to about 0.65 pounds per square yard. The spheroidal resinous particles had the same average particle size and composition as those used in Example 1.

A heated chrome drum provided with a reinforced silicon tension belt was used to embed the spheroidal resinous particles into the adhesive layer while gelling the adhesive. The drum had a diameter of about 2 meters and the outer surface was maintained at a temperature of about 300 degrees F. A gradually increasing normal force was applied by the belt which was maintained at a tension of about 15 pounds per linear inch. Contact time between the drum surface and the material in process was about 16 seconds. The material coming off the drum had a firm sandy surface.

A reverse roll coater was used to coat the firm sandy surface with a layer about 15 mils thick of a transparent, well deaerated plastisol having the same composition as the adhesive layer. This layer was gelled and smoothed by contacting the ungelled surface with a heated chrome drum and using a floating rubber nip roller to maintain sufficient pressure against the drum to create a rolling bank in the nip. The surface of the drum was maintained at a temperature from about 300 to about 335 degrees F. Contact time between the drum surface and the material in process was about 16 seconds to assure complete solidification.

The material coming off the drum was immediately passed under a series of gas burners to bring the surface temperature up to about 330 degrees F. Then the plastic surface was textured between a water cooled steel embosser roll and a rubber roll.

All of the foregoing steps were carried out in line at a speed of about 50 feet per minute.

The embossed product was coated with a deaerated plastisol topcoat layer having the same composition as the topcoat layer in Example 1. This layer was applied to a thickness of about 15 mils using a reverse roll coater. The wet coated product was then fused in a recirculating hot air oven. The temperature profile in the oven in seven successive zones was maintained at about 266, 320, 390, 385, 385, 385 and 385 degrees F., respectively, with the 266 degree F. zone being the zone of entry of the wet coated product into the oven. Residence time of the product in each zone was about the same, with total residence time in the oven being about 3 minutes. This step fused the topcoat layer to the product and reversed the embossing, thereby providing a reverse-embossed textured surface.

The reverse-embossed textured surface was coated to a thickness of about 0.75 mils with PHOTOGLAZE U-213 ultraviolet curable polyurethane (a trademark of Lord Corporation, Chemical Products Group, 200 West Grandview Boulevard, Erie, Pa.). An air knife coater was used to apply the polyurethane coating. The wet coating was cured by successively passing it through two conventional ultraviolet curing chambers which were flushed with nitrogen as inert gas (to effectively remove oxygen from the curing atmosphere and thereby enhance the cure).

EXAMPLE 3

A static-dissipative product can be made using the same process as set forth in Example 2.

The substrate material is modified by incorporating into it from about 1.1–2% by weight carbon fibers having an average length of about ½ inch. This gives the substrate a surface to surface and surface to ground resistance of from about 0 to 50,000 ohms.

The tinted latex layer has the following composition:

| Component | Parts by Weight |
| --- | --- |
| Sodium hexametaphosphate | 1 |
| Water | 220 |
| Aluminum trihydrate | 150 |
| Ethylene-vinylacetate latex (50%) | 130 |
| Nopcostate HS (Diamond Shamrock) | 6.5 |

Aqueous dispersion of color pigment as needed.

The vinyl plastisol adhesive layer and the plastisol smooth coating layer have the same composition as follows:

| Component | Parts by Weight |
| --- | --- |
| PVC dispersion resin having a K value of 65 (Occidental FPC 605) | 70 |
| PVC extender resin having a K value of 60 (Goodyear Pliovic M 50) | 30 |
| Glycol-butyrate-benzoate (Nuoplaz 1538, Tenneco Chemicals, Inc.) | 18 |
| Texanol isobutyrate (Eastman TXIB) | 11 |
| Barium-zinc stabilizer | 4 |
| Epoxidized soya oil | 5 |
| Zinc borate | 5 |
| Aluminum trihydrate | 5 |
| Tebestat IK 12 (Boehme KG, Germany) | 10 |

The topcoat layer has the following composition:

| Component | Parts by Weight |
| --- | --- |
| PVC dispersion resin having a relative viscosity of 2.3 | 30 |
| PVC dispersion resin having a relative viscosity of 3.3 | 30 |
| PVC extender resin having a K value of 60 (Goodyear Pliovic M 50) | 40 |
| Glycol-butyrate-benzoate | 15 |
| Texanol isobutyrate | 8 |
| Di-iso nonyl phtalate | 8 |
| Barium-zinc stabilizer | 4 |
| Epoxidized soya oil | 5 |
| Zinc borate | 3 |
| Tebestat IK 12 | 10 |

A polyurethane wearlayer is not used.

The scope of the present invention is now more particularly set forth in the appended claims.

We claim:

1. An inlaid floor covering having a uniform, unpatterned decorative appearance which comprises:
   a) a relatively flat substrate;
   b) a matrix layer overlaying said substrate, the matrix layer consisting essentially of a resin in which are embedded spheroidal particles having an aspect ratio no greater than about 2:1, wherein said particles are colored and are selected from the group consisting of translucent and opaque, and are provided in a uniform, unpatterned matrix and in a density from about 0.55 to about 0.8 pounds per square yard to prevent the underlying material from showing through, wherein the colors of the spheroidal particles determine the colors of the floor covering.

2. The decorative inlaid floorcovering of claim 1 wherein a tinted latex layer is provided between said substrate and said matrix layer.

3. The decorative inlaid floorcovering of claim 2 wherein the latex layer is tinted to a color which is the average of the colors of the spheroidal particles.

4. The decorative inlaid floorcovering of claim 3 wherein the the spheroidal particles are selected from the group consisting of ceramic, metal, rubber, acrylic, plastisol, polyamide, polyolefin, polycarbonate and polyester.

5. The decorative inlaid floorcovering of claim 4 wherein a wearlayer selected from the group consisting of plastisol and polyurethane is provided overlaying said matrix layer.

6. The decorative inlaid floorcovering of claim 5 wherein the spheroidal particles are polyvinyl chloride.

7. The decorative inlaid floorcovering of claim 6 further comprising an effective amount of a smoke suppressant composition in the substrate, latex layer, matrix layer, particles or wearlayer.

8. The decorative inlaid floorcovering of claim 7 further comprising an effective amount of a flame retardant composition in the substrate, latex layer, matrix layer, particles or wearlayer.

9. The decorative inlaid floorcovering of claim 8 further comprising an effective amount of an antistatic agent in the substrate, latex layer, matrix layer or wearlayer.

10. The decorative inlaid floorcovering of claim 1 wherein a wearlayer selected from the group consisting of plastisol and polyurethane is provided overlaying said matrix layer.

11. The floor covering of claim 1 wherein the density is from about 0.55 to about 0.65 pounds per square yard.

12. An intermediate for use in preparing an inlaid floor covering having a uniform, unpatterned decorative appearance which comprises:
   a) a relatively flat substrate;
   b) an ungelled vinyl plastisol adhesive layer overlaying said substrate; and
   c) a uniform unpatterned layer of spheroidal particles having an aspect ratio no greater than about 2:1 overlaying said ungelled vinyl plastisol adhesive layer, wherein said particles are colored and are selected from the group consisting of translucent and opaque, and are provided in a density from about 0.55 to about 0.8 pounds per square yard to prevent the underlying material from showing through such that the colors of the spheroidal particles determine the colors of said inlaid floor covering.

13. The intermediate of claim 12 wherein a tinted latex layer is provided between said substrate and said ungelled vinyl plastisol adhesive layer.

14. The intermediate of claim 13 wherein the latex layer is tinted to a color which is the average of the colors of the spheroidal particles.

15. The intermediate of claim 14 wherein the spheroidal particles are selected from the group consisting of ceramic, metal, rubber, acrylic, plastisol, polyamide, polyolefin, polycarbonate and polyester.

16. The intermediate of claim 15 further comprising an effective amount of a smoke suppressant composition in the substrate, latex layer, adhesive layer or particles.

17. The intermediate of claim 16 further comprising an effective amount of a flame retardant composition in the substrate, latex layer, adhesive layer or particles.

18. The intermediate of claim 17 further comprising an effective amount of an antistatic agent in the substrate, latex layer or adhesive layer.

19. The intermediate of claim 12 wherein the density is from about 0.55 to about 0.65 pounds per square yard.

20. A process for making an inlaid floor covering having a uniform unpatterned decorative appearance which comprises the sequential steps of:
   a) coating a relatively flat substrate with a layer of ungelled vinyl plastisol adhesive;
   b) depositing a uniform unpatterned layer of spheroidal colored particles selected from the group consisting of translucent and opaque, and having an aspect ratio no greater than about 2:1 in a density from about 0.55 to about 0.8 pounds per square yard to prevent the underlying material from showing through; and
   c) heating at a sufficient temperature for a sufficient time to embed said spheroidal particles in said ungelled vinyl plastisol adhesive and to gel the vinyl plastisol adhesive, thereby forming a matrix layer wherein the colors of the spheroidal particles determine the colors of the floor covering.

21. The process of claim 20 wherein the substrate is coated with a tinted latex layer prior to coating with said layer of ungelled vinyl plastisol.

22. The process of claim 21 wherein pressure is applied during the heating step to embed said spheroidal particles in said ungelled vinyl plastisol adhesive.

23. The process of claim 22 further comprising the step of coating the matrix layer with a composition selected from the group consisting of ungelled plastisol and urethane and curing said ungelled plastisol or urethane to form a wear-layer.

24. The process of claim 20 wherein pressure is applied during the heating step to embed said spheroidal particles in said ungelled vinyl plastisol adhesive.

25. The process of claim 24 further comprising the step of coating the matrix layer with a composition selected from the group consisting of ungelled plastisol and urethane and curing said ungelled plastisol or urethane to form a wear-layer.

26. The process of claim 20 wherein the density is from about 0.55 to about 0.65 pounds per square yard.

* * * * *